(12) United States Patent  (10) Patent No.: US 7,975,561 B1
Ambrosina et al.  (45) Date of Patent: Jul. 12, 2011

(54) CHAIN RING POWER SENSOR FOR A BICYCLE

(75) Inventors: Jesse Ambrosina, Topsfield, MA (US); Harald Quintus-Bosz, Sudbury, MA (US); Robert M. Shydo, Jr., Pelham, NH (US); Clint D. Kolda, Sioux Falls, SD (US); Jeffery T. Iverson, Madison, WI (US); Joshua G. Lohr, Madison, WI (US)

(73) Assignee: Saris Cycling Group, Inc., Madison, WI (US)

( * ) Notice: Subject to any disclaimer, the term of this patent is extended or adjusted under 35 U.S.C. 154(b) by 0 days.

(21) Appl. No.: 12/396,210

(22) Filed: Mar. 2, 2009

Related U.S. Application Data

(60) Provisional application No. 61/032,764, filed on Feb. 29, 2008.

(51) Int. Cl.
*G01L 3/02* (2006.01)
*G01L 1/22* (2006.01)

(52) U.S. Cl. ......... 73/862.338; 73/862.191; 73/862.321; 73/862.08

(58) Field of Classification Search ............... 73/379.07, 73/862.041–862.045, 862.08, 862.191, 862.627–862.629, 73/862.31, 862.321, 862.338; 272/73; 482/8, 482/57, 63
See application file for complete search history.

(56) References Cited

U.S. PATENT DOCUMENTS

| | | | | |
|---|---|---|---|---|
| 4,259,880 A * | 4/1981 | Ueno | ............................ | 74/594.2 |
| 5,027,303 A | 6/1991 | Witte | | |
| 5,031,455 A * | 7/1991 | Cline | ........................ | 73/379.01 |
| 5,591,908 A * | 1/1997 | Reid | .......................... | 73/379.07 |
| 5,894,094 A * | 4/1999 | Kuchler et al. | ........... | 73/862.044 |
| 6,199,021 B1 * | 3/2001 | Cote et al. | ........................ | 702/44 |
| 6,356,848 B1 * | 3/2002 | Cote et al. | ........................ | 702/44 |
| 6,418,797 B1 * | 7/2002 | Ambrosina et al. | ........ | 73/862.29 |
| 6,492,805 B1 * | 12/2002 | Wakabayashi et al. | ........ | 324/173 |
| 6,684,713 B2 * | 2/2004 | Nissila | .............................. | 73/775 |
| 7,047,817 B2 * | 5/2006 | Lanham | .............................. | 73/773 |
| 7,062,980 B2 * | 6/2006 | Takamoto et al. | .......... | 73/862.31 |
| 7,257,468 B1 * | 8/2007 | Costa et al. | ........................ | 701/1 |
| 2005/0132820 A1 | 6/2005 | Eilersen | | |
| 2005/0178210 A1 | 8/2005 | Lanham | | |
| 2007/0182122 A1 * | 8/2007 | Smith | ............................ | 280/256 |
| 2008/0236293 A1 * | 10/2008 | Meggiolan | ...................... | 73/794 |
| 2008/0314193 A1 * | 12/2008 | Meggiolan | .................... | 74/594.1 |
| 2009/0119032 A1 * | 5/2009 | Meyer | ............................ | 702/44 |
| 2009/0120208 A1 * | 5/2009 | Meyer | ....................... | 73/862.045 |
| 2009/0120210 A1 * | 5/2009 | Phillips et al. | ............ | 73/862.338 |

FOREIGN PATENT DOCUMENTS

| | | |
|---|---|---|
| WO | WO 01/30643 | 5/2001 |
| WO | WO 2008/058164 | 5/2008 |

* cited by examiner

*Primary Examiner* — Lisa M Caputo
*Assistant Examiner* — Jonathan Dunlap
(74) *Attorney, Agent, or Firm* — Boyle Fredrickson, S.C.

(57) ABSTRACT

A torque sensing arrangement has a set of strain sensors, such as strain gauges, mounted to an adapter that can be mounted to a chain ring of the crank set of a bicycle wheel. The adapter may have an annular body that can be used to retrofit the original crank set of a bicycle to have torque sensing components without having to replace the chain rings or the crank arm of the crank set. Together with angular velocity measurements, the measurements of the strain sensors may be used to calculate the amount of work or power exerted by the cyclist to propel the bicycle.

25 Claims, 10 Drawing Sheets

CHAIN RING POWER SENSOR FOR A BICYCLE

CROSS-REFERENCE TO RELATED APPLICATION

The present invention claims the benefit of U.S. Ser. No. 61/032,764, filed Feb. 29, 2008, the entire disclosure of which is incorporated herein by reference.

BACKGROUND OF THE INVENTION

The present invention relates generally to performance measuring systems for use with bicycles and, more particularly, to a chain ring based power measuring apparatus that measures the amount of work done by a cyclist to rotate a wheel of a bicycle.

Power is generally defined as the product of torque and angular velocity or the product of force and velocity. In this regard, power cannot be determined directly, but can be calculated from torque and velocity information acquired as the cyclist propels the bicycle. As power corresponds to work done, cyclists are increasingly outfitting their bicycles with power measuring systems that provide speed and power feedback, such as instantaneous speed, instantaneous power, average speed, average power, and other metrics to assess the intensity of a ride.

Conventional power measuring systems, commonly referred to as "power meters", typically measure torque and angular velocity in either the driving components of the bicycle, such as the pedals and crank arms, or in the driven components of the bicycle, such as the chain rings, chain, and rear wheel. U.S. Pat. No. 6,418,797, the disclosure of which is incorporated herein, describes a rear wheel hub assembly that has torque and angular velocity sensing components as well as electronics that use torque and angular velocity information to calculate power and other performance metrics, the values of which may be displayed on a handlebar mounted display.

One of the drawbacks of conventional power measuring systems, especially those that measure torque and angular velocity in a driven component, has been the difficulty in incorporating such a system into a bicycle. Typically, it is necessary to employ a mechanic having the appropriate tools and training necessary to disassemble and remove the driven components of the rear wheel, install the power measuring system and then reassemble the driven components. Recreational cyclists, however, generally lack the tools and skill set to properly make such a modification.

Additionally, many power measuring systems have components that replace one or more of the original components of the bicycle, such as the crank set or the rear hub. For a competitive cyclist or enthusiast, the benefits associated with the information provided by a power meter are often found to outweigh the costs of discarding an original component despite the original component being in working condition. A recreational cyclist, on the other hand, may object to the cost associated with replacing the crank set or the rear hub.

SUMMARY OF THE INVENTION

A chain ring based power meter is proposed that measures the amount of work done by a cyclist to propel a bicycle. The power meter includes an adapter ring that carries a series of spaced strain sensing elements. The adapter ring is designed to interface with the existing components of a crank set. In this regard, the adapter ring can be an add-on component to an existing crank set and thus does not require existing components of the crank set to be replaced or discarded. Additionally, it is believed the adapter ring can be installed relatively easily.

According to one aspect of the invention, a chain ring torque sensing assembly for use with a bicycle is provided. The assembly has a ring having a first set of mounting points for coupling to a chain ring of the bicycle and has a second set of mounting points for coupling to the crank arm of the bicycle. The assembly also has at least one strain sensor associated with the ring and adapted to measure strain resulting from torque applied to the crank arm by a cyclist during riding of the bicycle.

In accordance with another aspect of the invention, a kit for retrofitting a crank set of a bicycle to include a torque sensing device is provided. The kit is comprised of an adapter ring supporting a strain sensor and is configured to be coupled to the crank arm of the bicycle and a chain ring of the bicycle. The kit also includes fasteners for coupling the adapter ring to one of the chain ring and the crank arm.

According to yet a further aspect of the invention, a crank set for a bicycle has a crank arm, a first and a second chain ring coupled to the crank arm, a generally annular body mounted to one of the crank arm and a chain ring, and a strain gauge arrangement mounted to the generally annular body. The strain gauge arrangement is configured to measure the torque applied by a cyclist to propel the bicycle It is therefore an object of the invention to provide a crank set based power meter.

It is another object of the invention to provide a crank set based power meter than can be used with the existing crank set of a bicycle.

It is another object of the invention to provide a crank set based power meter than can be installed by a non-professional.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
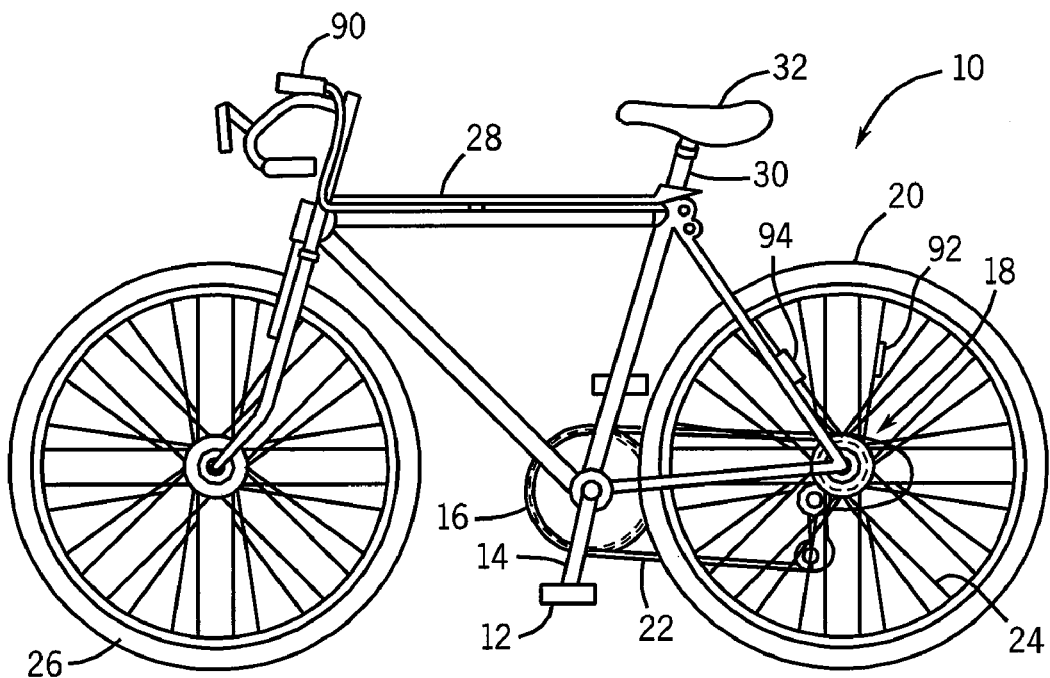
FIG. 1 is a schematic pictorial view of a bicycle equipped with a power measurement system according to one aspect of the invention.

Referring now to FIG. 1, a bicycle 10 typically includes a pair of pedals 12 connected by a crank arm 14 to a chain ring 16. The chain ring 16 is coupled to the hub assembly 18 of the rear wheel 20 by a chain 22. The bicycle 10 is powered by a cyclist providing rotational forces to the chain ring 16 via the pedals 12 and crank arm 14. The rotation of the chain ring 16 is transferred by the chain 22 to the rear wheel hub assembly 18, which carries the rear wheel 20 into rotation via spokes 24 to drive the bicycle into motion. As is known in the art, the bicycle 10 also includes a front wheel 26 connected to the rear wheel 20 by a frame 28 that includes a seat post 30 and seat 32 for supporting a rider.

Figure 2:
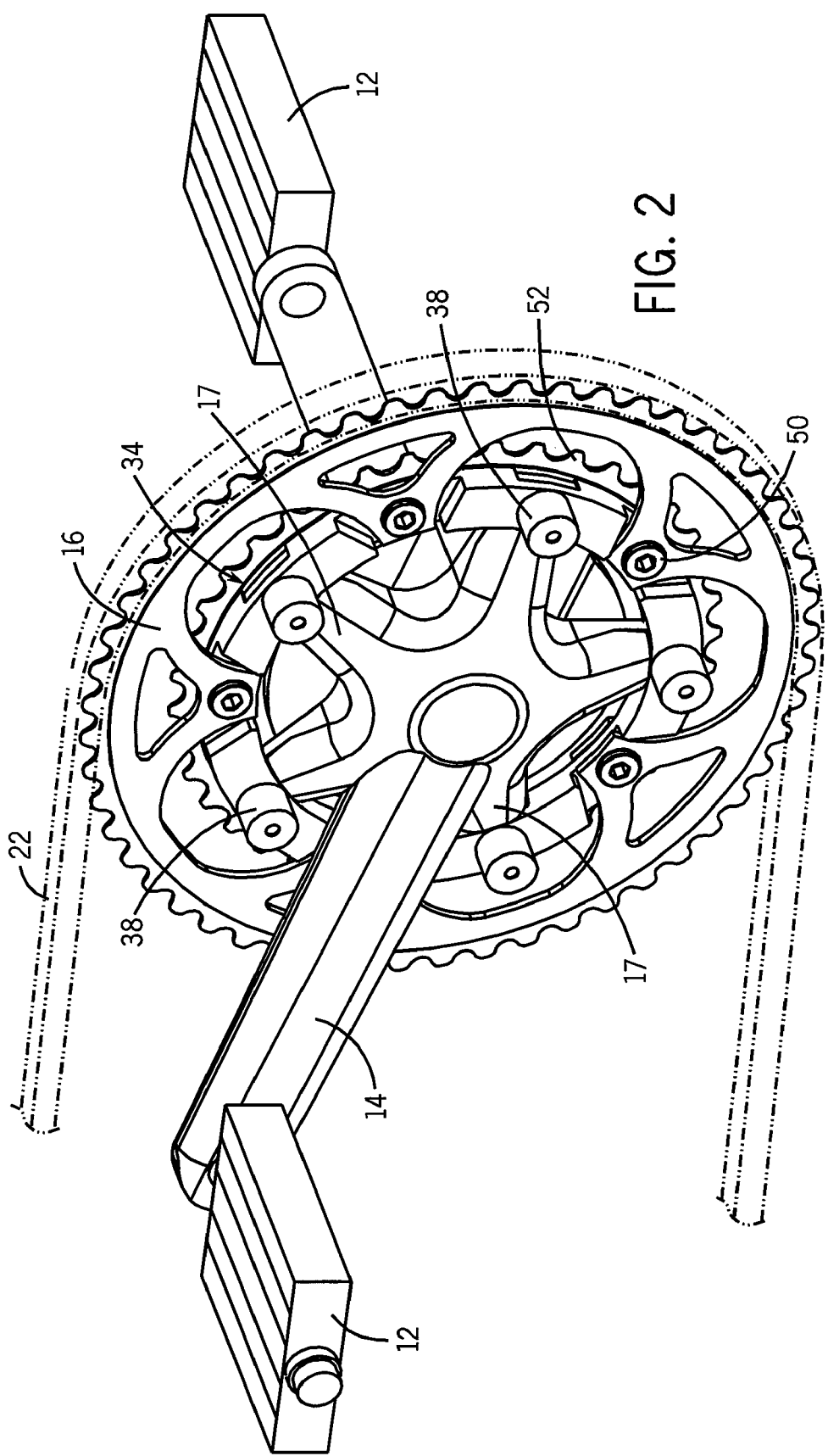
FIG. 2 is an isometric view of the crank set of the bicycle shown in FIG. 1 and having a torque sensing arrangement according to one embodiment of the invention.
Figure 3:
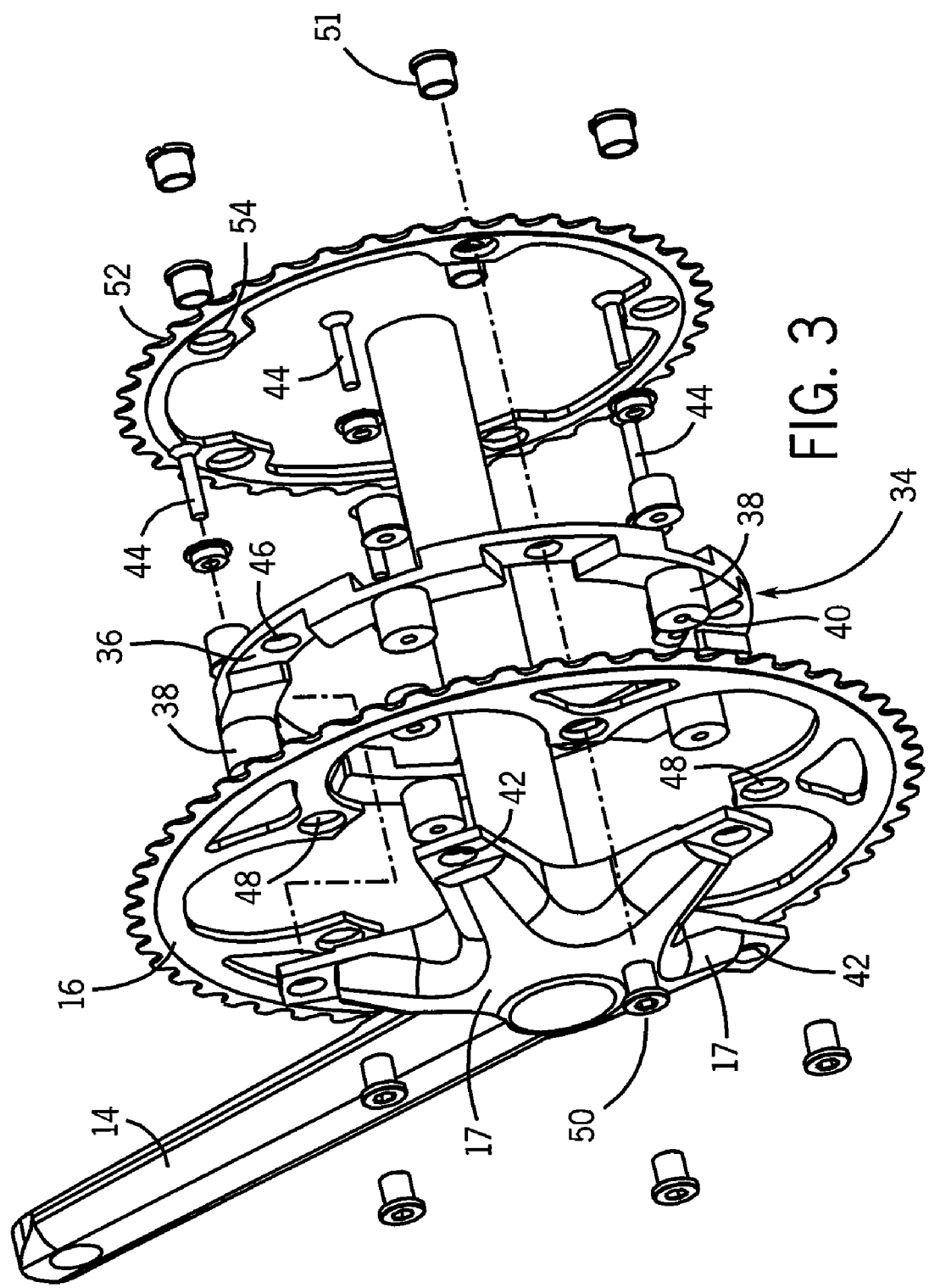
FIG. 3 is an exploded view of the crank set shown in FIG. 2.
Figure 4:
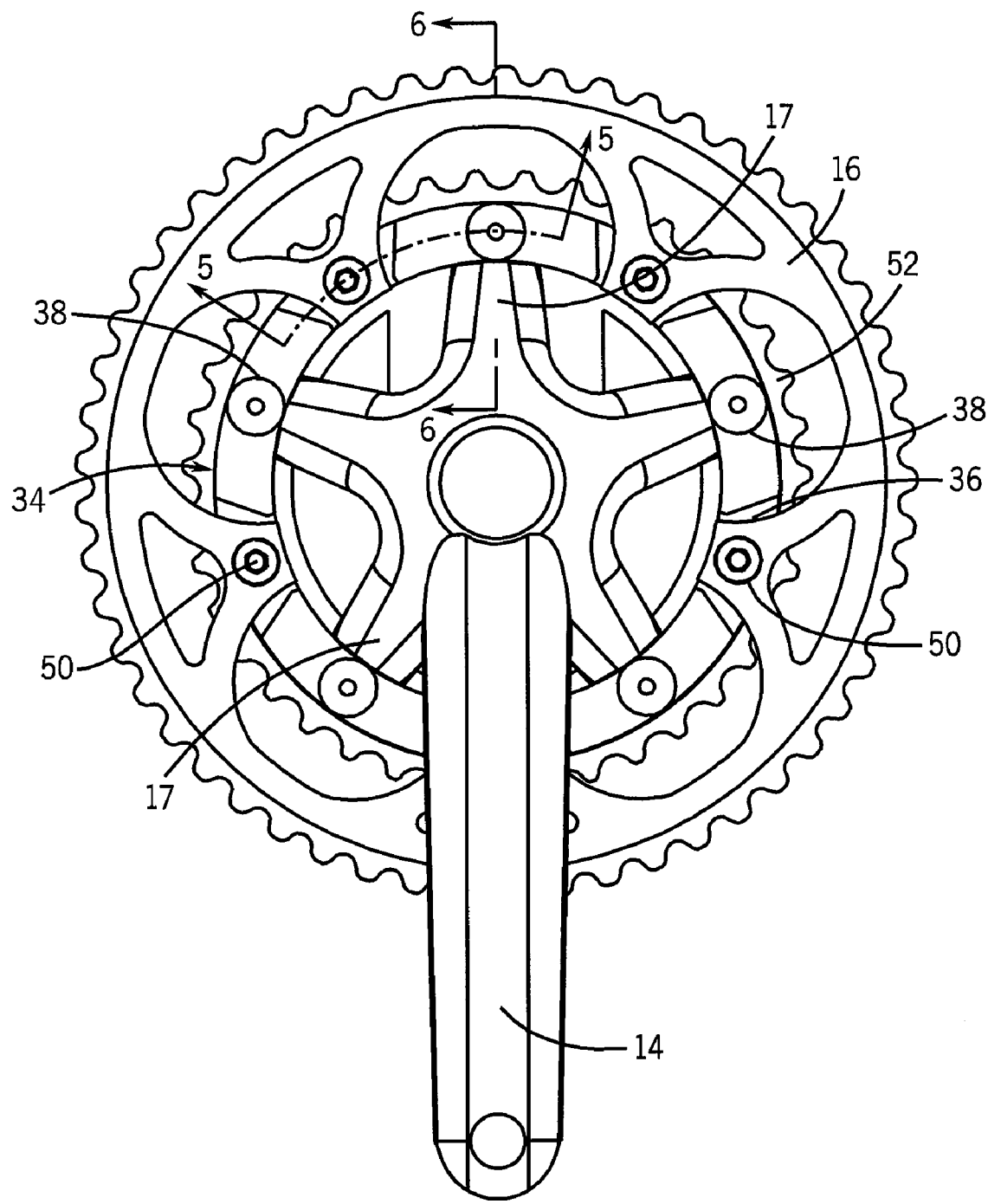
FIG. 4 is a side elevation view of the crank set shown in FIGS. 2-3.

Referring now to FIGS. 2-4, in a conventional bicycle the chain ring 16 is mounted directly to the inner end of the crank arm 14, which is commonly referred to as the "spider" of the crank arm 14, and which defines a series of outwardly extending arms 17. The illustrated crank arm 14 is comprised of five arms 17. The present invention provides a torque sensing adapter member, in the form of a ring or link 34, that is coupled to the crank arm 14 and the chain ring 16.

The adapter member 34 includes a generally planar annular body 36 to which a series of spaced sensor cells 38 are mounted or otherwise formed. A mounting hole 40 extends through each cell 38 and aligns with an opening 42 formed at the end of each spider arm 17. Fasteners 44, such as bolts, may then be inserted through the holes 40 and the openings 42 to secure the adapter member 34 to the spider arms 17. The adapter member 34 also includes a number of spaced holes 46 that align with corresponding openings 48 of the chain ring 16. Fasteners 50 and caps 51 may then be used to fasten the chain ring 16 to the adapter member 34. It will be appreciated that an inner chain ring 52 having openings 54 may be aligned with the openings 42 of the spider arms 17. Fasteners 50 and caps 51 may be used to couple the chain ring 16 to the adapter member 34. It will thus be appreciated that the adapter member 34 provides mounting points for the existing chain rings of a bicycle to mount the chain rings to the adapter member 34. The adapter member 34 then serves as the chain ring mount to the crank arm 14.

Figure 5:
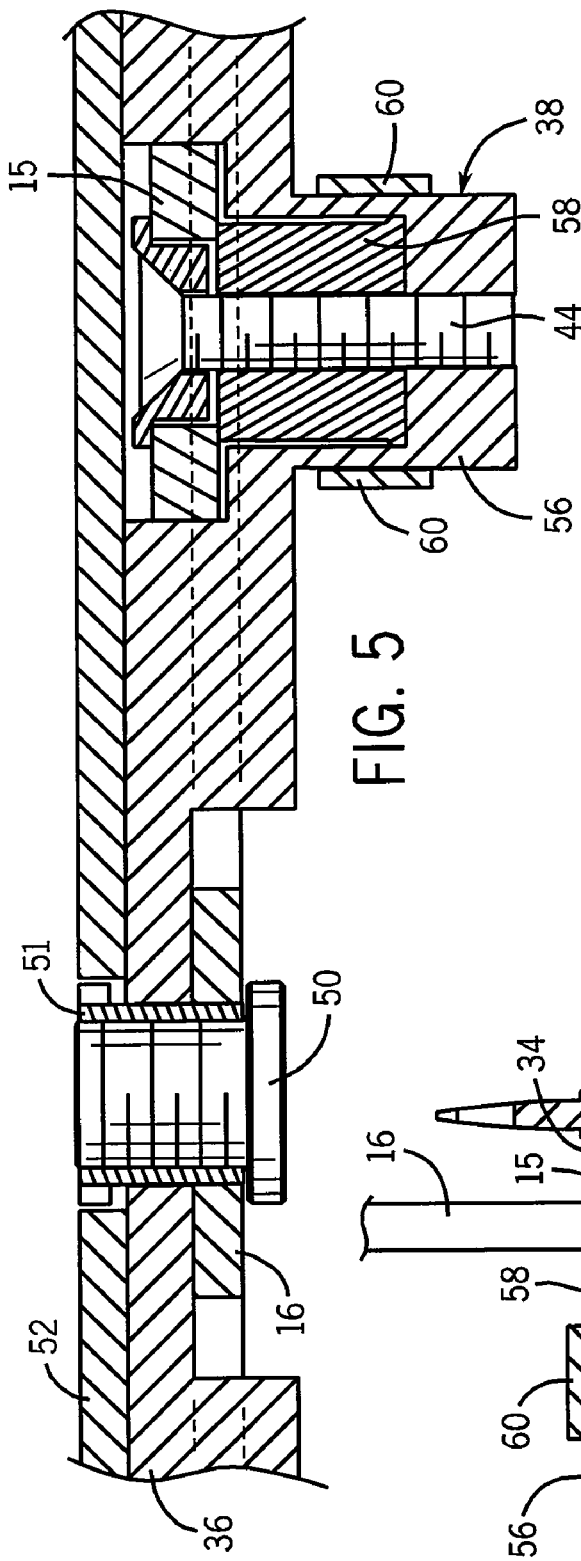
FIG. 5 is a section view of the crank set taken along line 5-5 of FIG. 4.
Figure 6:
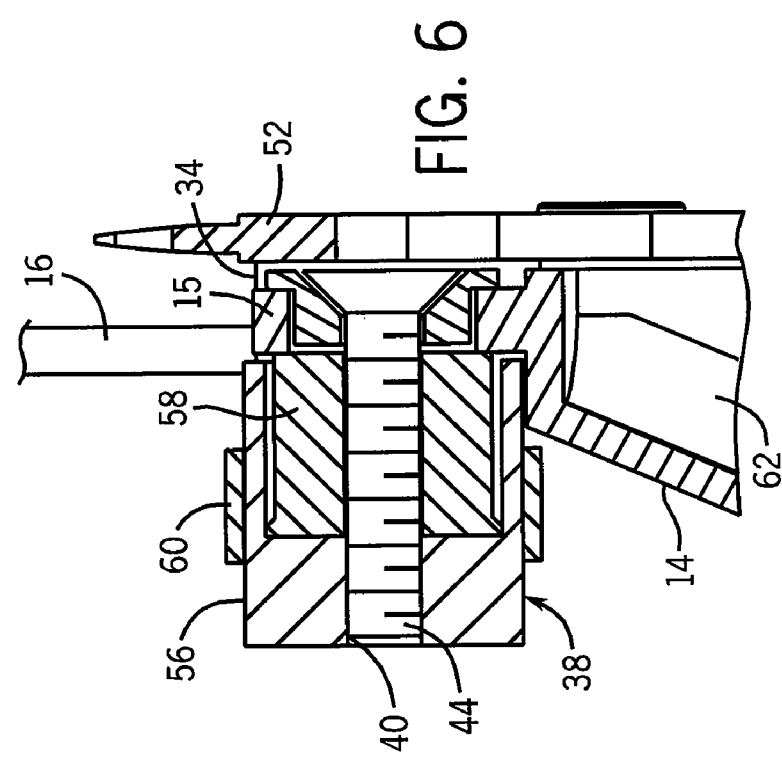
FIG. 6 is a section view of the crank set taken along line 6-6 of FIG. 4.

With additional reference to FIGS. 5-6, each sensor cell 38 includes a cylindrical post 56 extending outwardly from the adapter member body 36 generally toward the crank arm 14. The bolt 44 extends into the post 56 along a central axis. A spacer 58 is located in the interior of the post 56, and functions as a standoff to slightly space the adapter member 34 from the arm 17 of the crank arm 14. One or more strain gauges 60 are attached to the outer surface of the post 56 in a known manner. Each strain gauge 60 communicates with circuitry contained on a circuit board, such as shown at 62, which may be secured to the spider arm 17 or in any other satisfactory location.

Each strain gauge 60, which in one representative embodiment includes one strain gauge for each spider arm 17, is designed to measure the shear strain experienced by a force transmission area of the post 56 defined by a void area between the post 56 and the spacer 58, when forces are applied to the crank arm 14 by the cyclist. The forces applied by the cyclist are transferred as torque from the crank arm 14 through the spider arms 17, and then through the bolts 44 to the adapter member 34, where such forces result in shear strain on the posts 56, which function to transfer the forces to the chain ring connection areas and to the chain ring 16. The strain experienced by the posts 56 is proportional to applied torque, and is measured by the strain gauges 60 which, in turn, output corresponding electrical signals to the circuitry contained on circuit board 62. In a manner as is known, the circuitry may then process the strain readings and determine the torque imparted by the cyclist, or alternatively transmit the readings to a remote processor that determines the applied torque. The torque value may then be used together with measurements of angular velocity to determine the work or power of the cyclist to move the bicycle. The strain gauges 60 may also be used to measure strain resulting from tension, compression, and/or bending stresses placed on the posts 56 as a result of the torque placed on the crank arms during pedaling of the bicycle.

Figure 7:
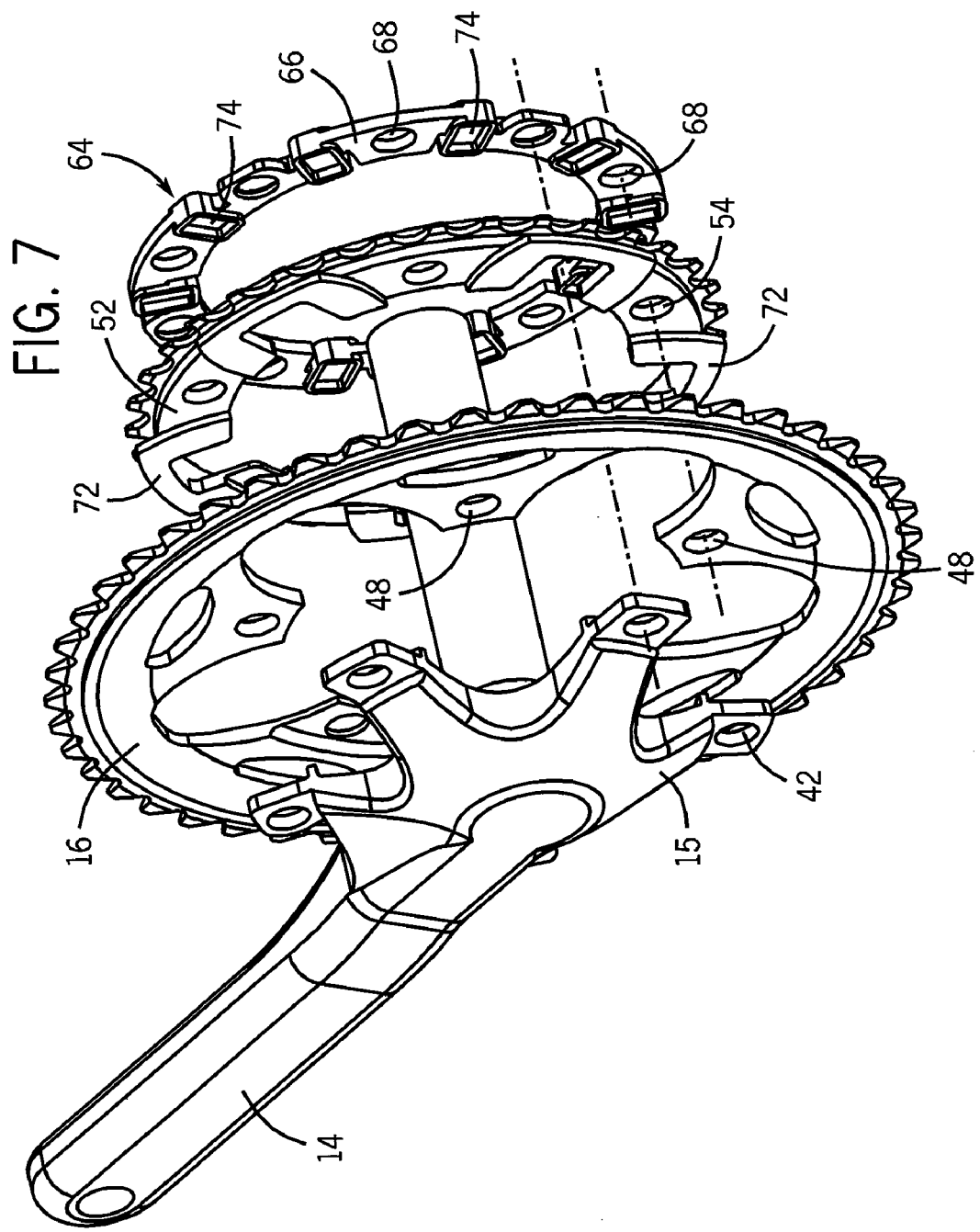
FIG. 7 is an exploded view of a crank set having a torque sensing arrangement according to an alternate embodiment of the invention.
Figure 8:
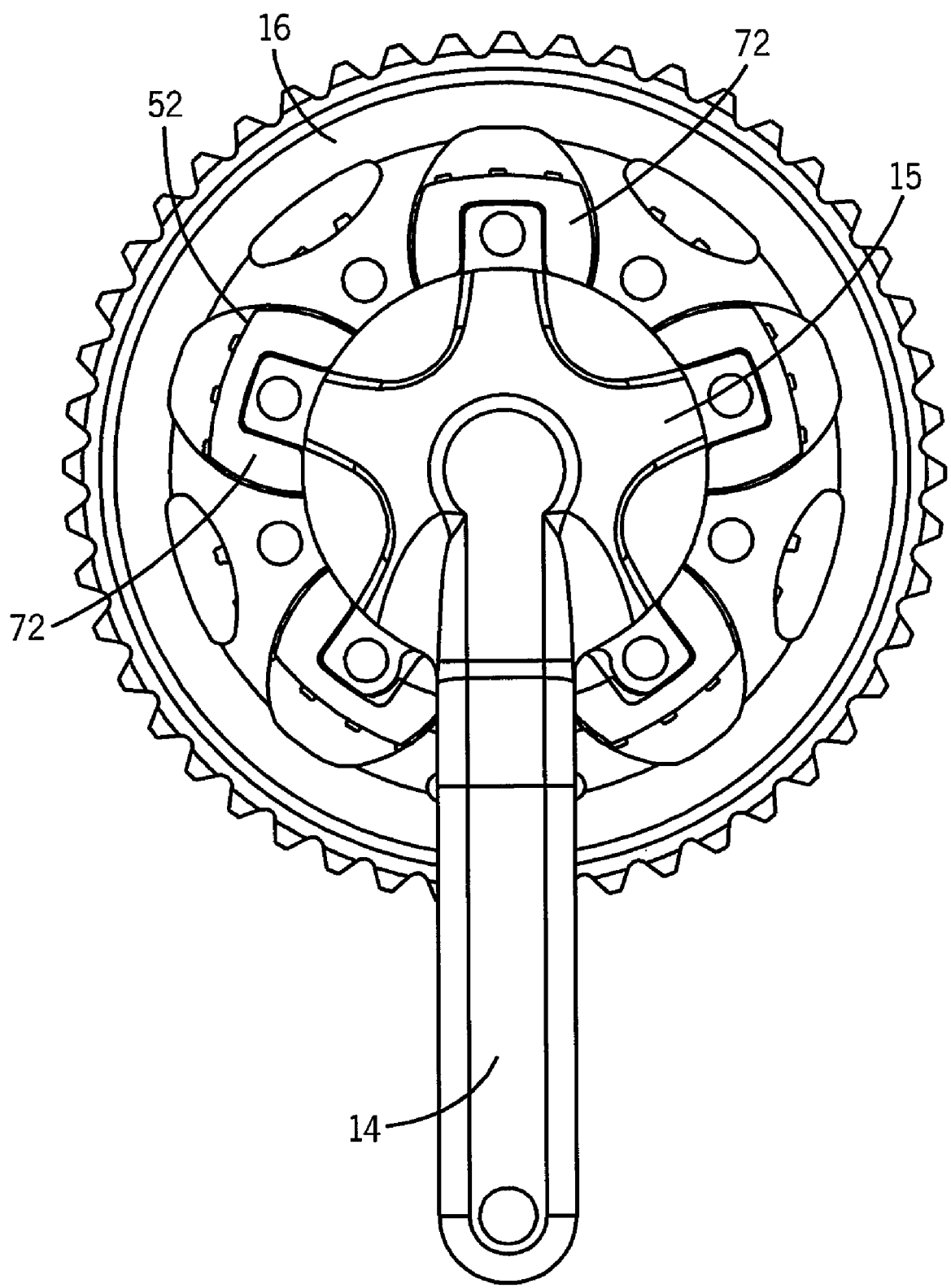
FIG. 8 is an elevation view of the crank set shown in FIG. 7.

As illustrated in FIGS. 2-6, adapter member 34 may be mounted so that it is positioned between chain ring 16 and chain ring 52. FIGS. 7-8 illustrate another configuration in which an adapter member 64 according to another embodiment of the invention is mounted such that inner chain ring 52 is mounted between chain ring 16 and the adapter member 64. Adapter member 64 has a generally annular body 66 with two sets of spaced openings 68 and 70. Openings 68 are aligned with openings 48 of chain ring 16 and openings 54 of chain ring 52. Suitable fasteners (not shown) may be used to couple the chain rings 16, 52 and the adapter member 64 to one another as a single unit. This unit may then be mounted to the spider arms 17 of the crank arm 14 using suitable fasteners (not shown), such as those that were previously described to secure the chain rings 16, 52 to the spider arms 17. In this regard, openings 70 of the adapter member 64 align with openings 42 of the spider arms 17. Optionally, chain ring 54 may include members 72 that provide additional structural integrity for chain ring 52. Thus, in one embodiment, chain ring 52 may replace the original inner chain ring of the crank set when the adapter member 64 is added to the crank set. As also illustrated in FIGS. 7-8, the adapter member 64 has a shallower profile than the adapter member 34 shown in FIGS. 2-6. In this alternate configuration, the annular body 66 has a series of spaced recesses 74 in which strain sensors (not shown) may be placed and a cap (not shown) or other structure used to cover the strain sensors. In the illustrated embodiment, there are ten recesses 74 which provides for five pairs or bridges of strain sensors.

Figure 9:
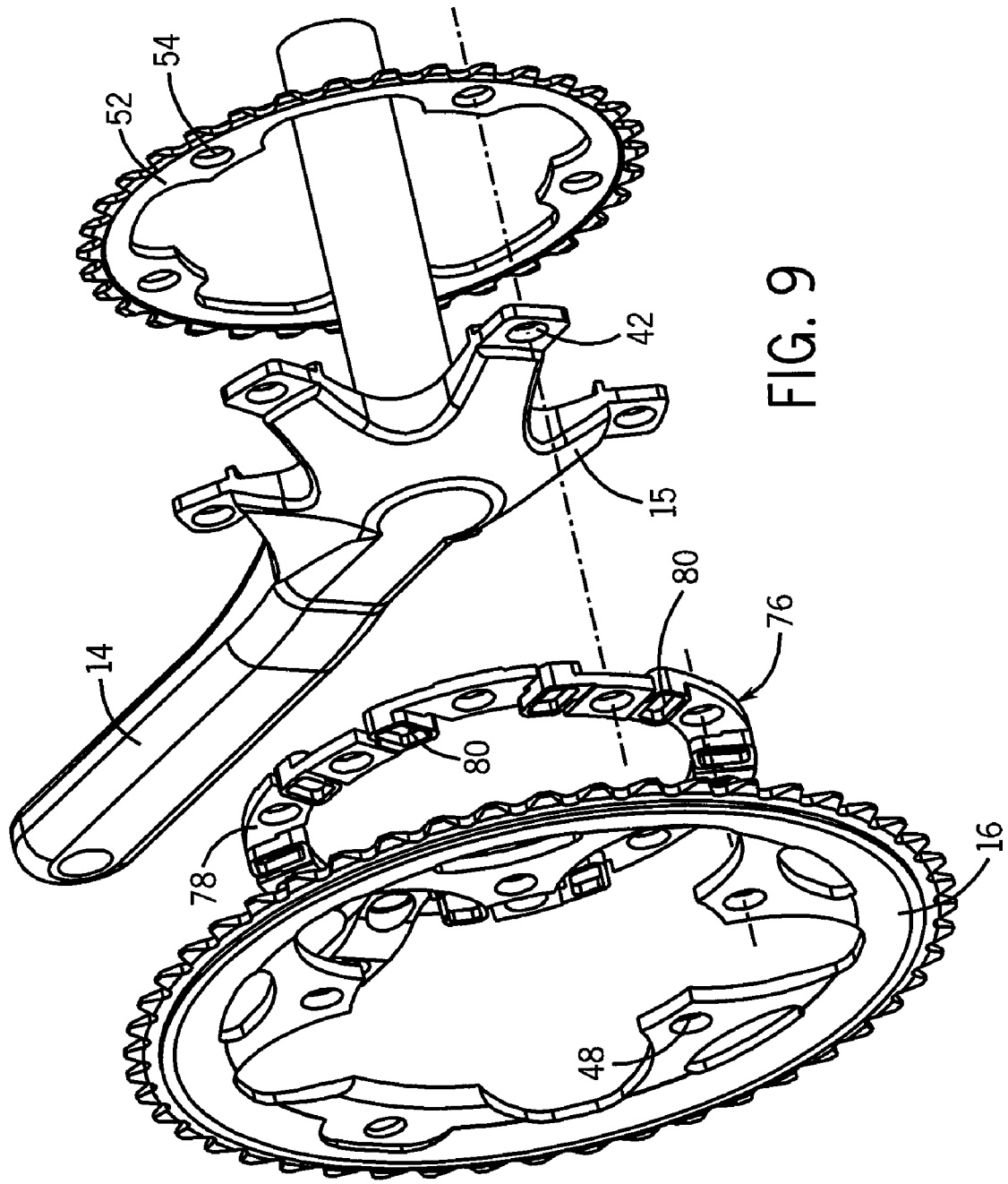
FIG. 9 is an exploded view of a crank set having a torque sensing arrangement according to another alternate embodiment of the invention.
Figure 10:
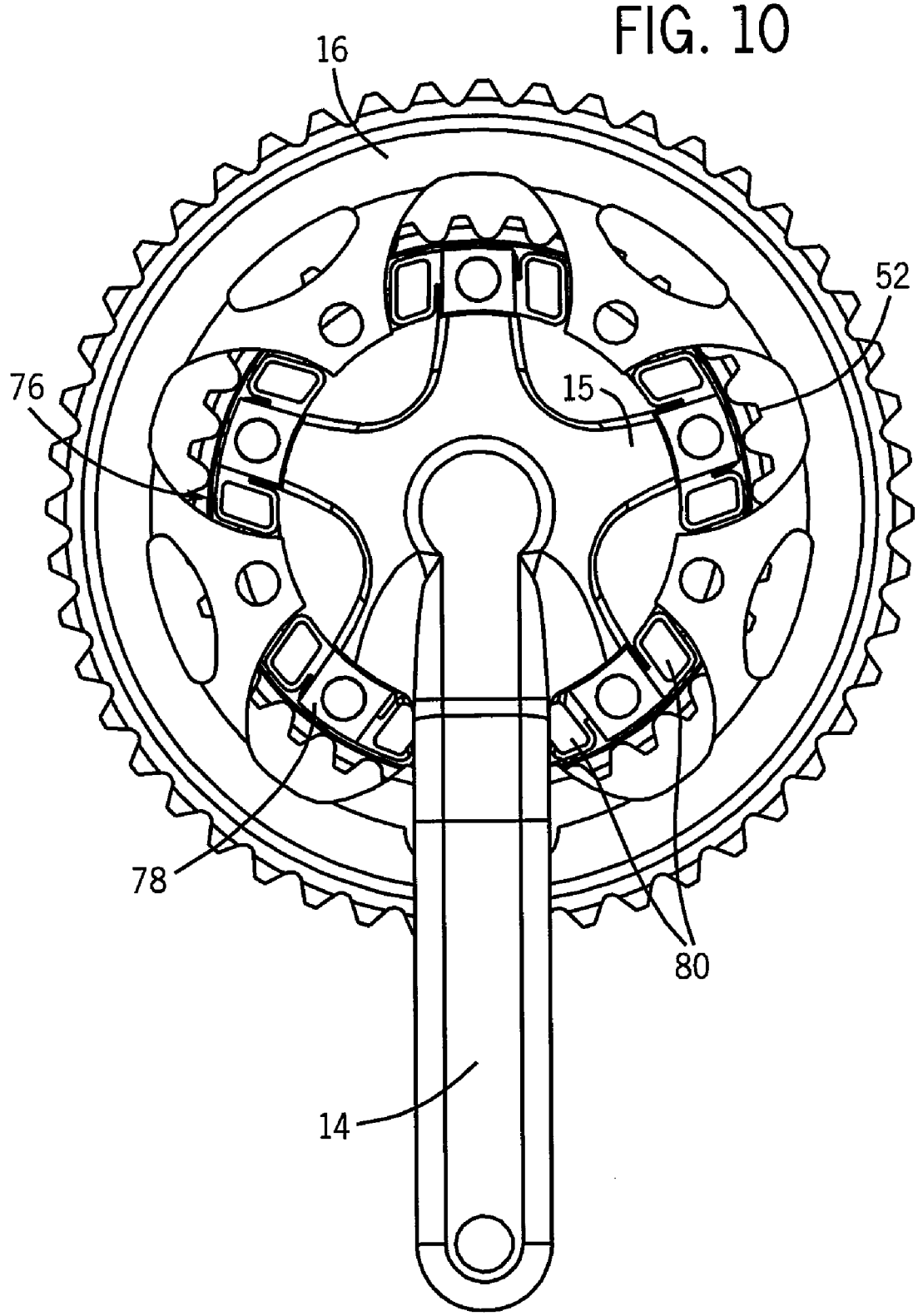
FIG. 10 is an elevation view of the crank set shown in FIG. 9.

FIGS. 9-10 illustrate yet another configuration according to one aspect of the invention. In this embodiment, adapter member 76, which has a generally annular body 78, is configured to be mounted such that sensor ring 76 is located between larger chain ring 16 and the crank arm 14. As particularly shown in FIG. 10, the adapter member 76 is recessed within the inner chain ring 52. The annular body 78 has a series of recesses 80 that house the strain sensors, similar to that shown in FIGS. 7-8. Each recess 80 is contained within a force transmission area of annular body 78 between a pair of void areas formed in annular body 78, one of which extends inwardly from the outer edge of annular body 78 and the other of which extends outwardly from the inner edge of annular body 78. Also similar to the member shown in FIGS. 7-8, two sets of openings are formed in the annular body 78. Openings 82 align with openings 42 of the crank arm and openings 54 of the inner chain ring 52. Openings 84 align with openings 48 of chain ring 16. Suitable fasteners (not shown) may then be used to secure the rings, adapter member, and crank arm together to form an assembled unit. One skilled in the art will therefore appreciate that chain ring 16 and the adapter member 76 may first be coupled to one another and that assembled unit can then be coupled to the crank arm 14 and chain ring 52.

Figure 11:
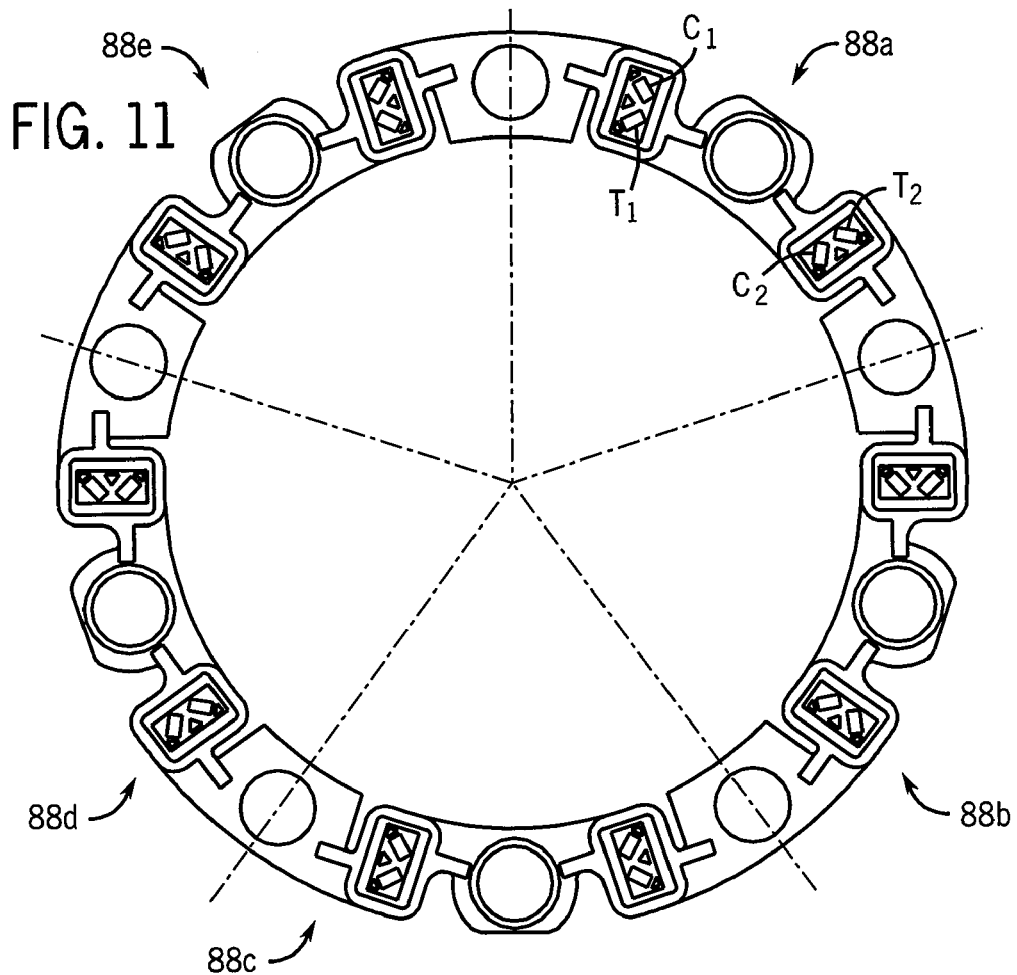
FIG. 11 is a schematic view of a strain gauge layout for one embodiment of the torque sensing arrangement according to the invention.

FIG. 11 illustrates a strain gauge layout 86 according to one embodiment of the invention. As shown in the figure, the layout 86 provide five separate bridges 88(a), 88(b), 88(c), 88(d), and 88(e). In a preferred embodiment, each bridge has a first pair of strain gauges $T_1$ and $T_2$ that measure tensile forces and a second pair of strain gauges $C_1$ and $C_2$ that measure compressive forces. The use of strain gauge pairs is preferred to nullify off-axis loads thereby providing more accurate measurements. The layout 86 is also believed to nullify non-torsional (non-power). loads as well as temperature shifts.

Figure 12:
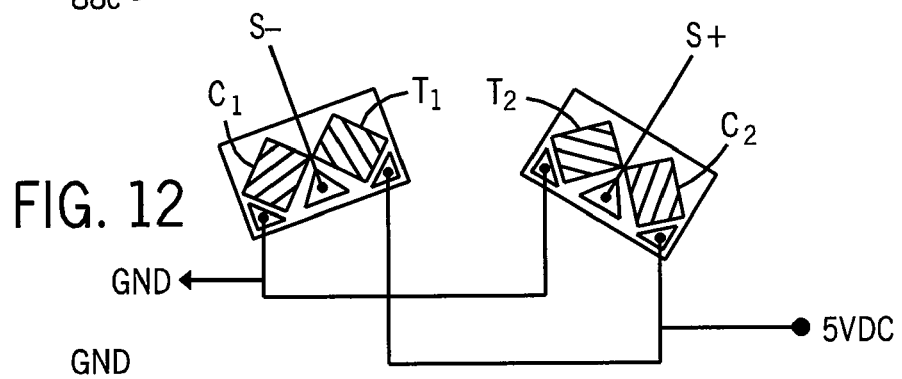
FIG. 12 is a schematic of a wiring diagram for one bridge of strain gauges according to one embodiment of the invention.
Figure 13:
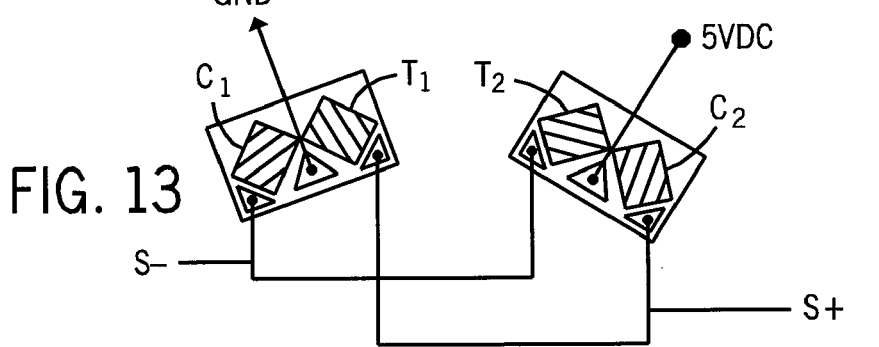
FIG. 13 is a schematic of a wiring diagram for one bridge of strain gauges according to another embodiment of the invention.

Two exemplary wiring schemes for each strain gauge bridge are shown in FIGS. 12 and 13.

Figure 14:
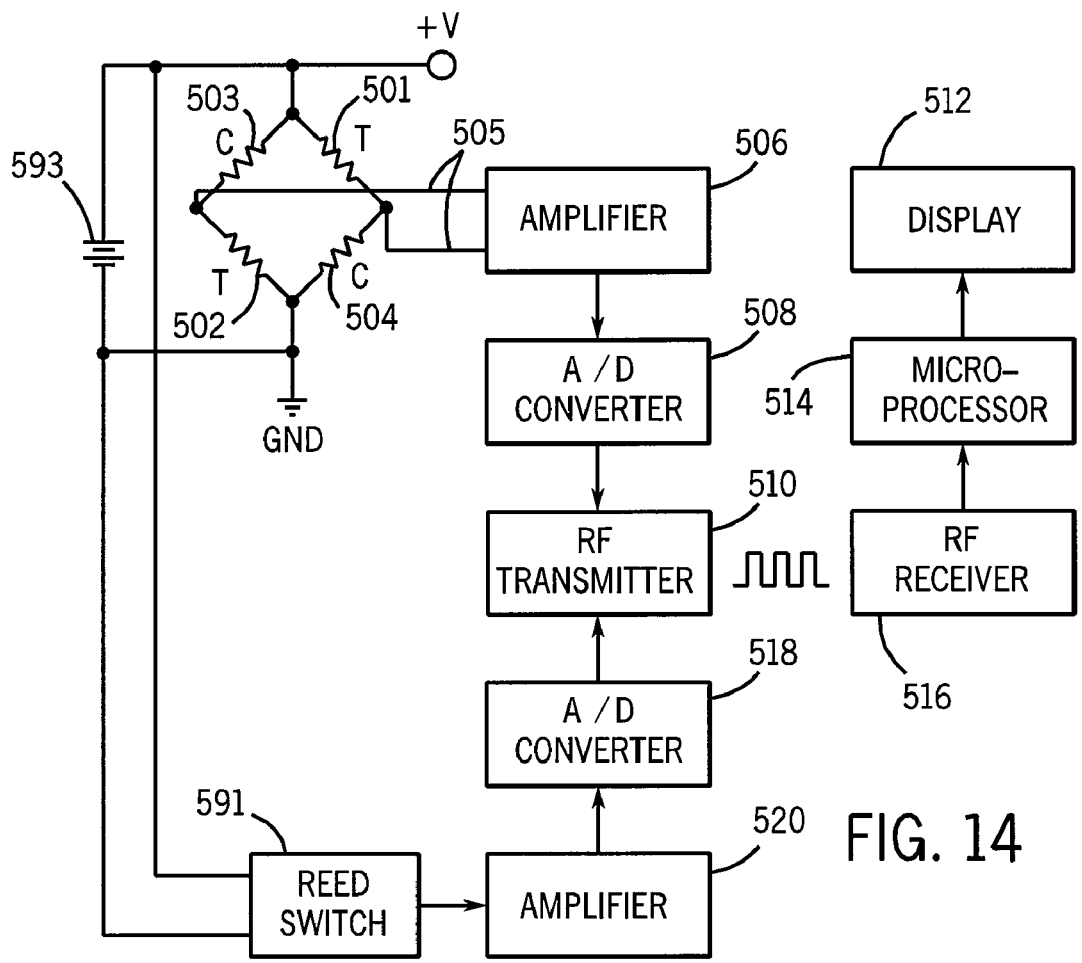
FIG. 14 is a schematic block diagram for one embodiment of the electronics of a power meter according to the invention.

Referring again to FIG. 1 and with additional reference to FIG. 14, bicycle 10 may include a computer 90 mounted to the frame 28 as well as a magnet 92 mounted to a spoke 24 of the rear wheel 20. A receiver module 94 is mounted to the frame 28 and includes an integral reed switch, which provides angular velocity information to the computer 90.

FIG. 14 is a schematic electrical block diagram which shows one embodiment of electronic circuitry which can be used to detect strain, torque, angular velocity and/or power in accordance with the invention. As shown, in one configuration, four strain gauges 501, 502, 503, 504 can be connected as shown in a bridge configuration. Two tension gauges 501 and 502 can be connected as shown in opposite arms of the bridge, and two compression gauges 503, 504 can be connected in the remaining two opposite arms. As shown, the battery 593 can be applied to the bridge to apply the excitation signal V+ to the bridge.

When the component to which the strain gauges are bonded undergoes tension and/or compression distortion due to applied torque, the resistances of the strain gauges change such that an imbalance is introduced into the bridge. As a result, a signal is developed on lines 505 which is indicative of the imbalance and, therefore, the strain. The signal on line 505 is conditioned by amplifier 506, and the amplified signal is transferred to an analog-to-digital converter 508, which converts the amplified signal into digital form. The digital data are then transferred to the RF transmitter 510, which transmits the signals to the RF receiver 516. The transmitted digitized strain signals are then transferred to a microprocessor 514, which computes a torque measurement from the strain signals. The torque measurement can then be displayed on a display 512.

The battery is also applied across the reed switch 591. As described above, as the magnet passes the reed switch, it activates the reed switch to generate a pulse-type signal. The signal is transferred to amplifier 520 which conditions the signal as necessary and passes the signal to another analog-to-digital converter 518. The signal is digitized and transferred to the RF transmitter 510 which transmits the digital data to the RF receiver 516. The data are then passed to microprocessor 514 which can use the data to compute the angular velocity of the wheel. This information can then be used in conjunction with the torque computation to provide an indication of power provided to the crank set.

All of the data processed by the microprocessor 514 can be displayed on the display 512 in any desired format. This information includes strain, torque, power, velocity, and other data as desired. The instantaneous power, average power and maximum power acquired during an exercise session, as well as typical cycle computer functions such as clock, time, distance and speed functions, can also be displayed.

It will be appreciated that while an adapter member having a generally annular body has been shown and described, it is understood that non-annular constructions may be used. It is preferred that the body of the annular member is formed as a single unitary member but the invention is not so limited. The invention may be used with compact crank sets as shown, or conventional three-ring crank sets as well as fixed gear and non-fixed gear bicycles. While a crank set having five spider arms 17 is shown, it is understood that the invention may be modified to be used with crank arms having more or fewer than five spider arms. In a preferred embodiment, the adapter member is made from aluminum but it is understood that other types of materials may be used. It is also contemplated that the adapter member could be integrally formed with a chain ring.

Additionally, it is contemplated that the original crank set of a bicycle may be made to incorporate a torque sensing arrangement and member as described herein, but the invention may also be used to retrofit an existing crank set.

Various alternatives and embodiments are contemplated as being within the scope of the following claims particularly pointing out and distinctly claiming the subject matter regarded as the invention

We claim:

1. A chain ring torque sensing assembly for use with a bicycle, the bicycle including a plurality of power input components including a crank arm and one or more chain rings, the assembly comprising:
    a sensor ring having a first set of mounting points on the sensor ring for coupling to a first one of the power input components and a second set of mounting points on the sensor ring for coupling to a second one of the power input components such that the sensor ring is positioned between and interconnects the first and second power input components through the first and second mounting points, wherein the first and second mounting points are at a common radius relative to a center of the sensor ring, and wherein the sensor ring has a closed body and includes at least one force transmission area defined at least in part by a void area in the sensor ring; and
    at least one strain sensor associated with the at least one force transmission area of the sensor ring and adapted to measure strain in the force transmission area resulting from power applied to the crank arm by a cyclist during riding of the bicycle.

2. The assembly of claim 1 wherein the closed body of the sensor ring has a plurality of force transmission areas and wherein a strain sensor is associated with each of the force transmission areas, wherein each strain sensor is adapted to measure the strain in the force transmission area resulting from the power applied to the crank arm.

3. The assembly of claim 2 wherein the sensor ring includes a plurality of posts extending outwardly from the annular body, and wherein each post defines a force transmission area and a strain sensor is connected to each post.

4. The assembly of claim 3, wherein each post defines an inner portion secured to one of the first and second power input components and an outer portion secured to the other of the first and second power input components, and wherein the void area is defined between the inner portion and outer portion of each post.

5. The assembly of claim 2, wherein the sensor ring is generally planar and wherein each force transmission area lies in the plane of the sensor ring, wherein the void area comprises a recess in the sensor ring.

6. The assembly of claim 5, wherein each force transmission area is defined between a pair of recesses in the sensor ring, wherein a first one of the recesses extends inwardly from an outer edge defined by the sensor ring and a second one of the recesses extends outwardly from an inner edge defined by the sensor ring.

7. The assembly of claim 1 further comprising circuitry communicatively linked with the at least one strain sensor and configured to determine a torque placed on the crank arm by the cyclist from strain readings output by the strain sensor.

8. The assembly of claim 7 further comprising an angular velocity sensor coupled to a rotating component of the bicycle, and wherein the circuitry determines a power exerted by the cyclist from the torque and angular velocity measurements provided by the velocity sensor.

9. The assembly of claim 8 further comprising a display mounted to the bicycle and wherein the circuitry causes a value of power, a value of torque, and/or a value of angular velocity to be shown on the display.

10. The assembly of claim 1 wherein the sensor ring is adapted to first be coupled to a chain ring to form an assembled unit, and wherein the assembled unit is then mountable to the crank arm.

11. The assembly of claim 1 wherein the bicycle has the first-mentioned chain ring and a second chain ring, wherein the first-mentioned chain ring has a first diameter and the second chain ring has a diameter smaller than the first diameter.

12. The assembly of claim 11 wherein the sensor ring is configured to be mounted between the first-mentioned chain ring and the second chain ring.

13. The assembly of claim 11 wherein the sensor ring is configured to be mounted such that the second chain ring is positioned between the first-mentioned chain ring and the sensor ring.

14. The assembly of claim 11 wherein the sensor ring is configured to be mounted such that the sensor ring is positioned between the first-mentioned chain ring and the crank arm.

15. A kit for retrofitting the crank set of a bicycle to include a torque sensing device, the crank set including a plurality of power input components including a crank arm and one or more chain rings, the kit comprising:
   an adapter member supporting a strain sensor, the adapter member having a first set of mounting points for interfacing with corresponding mounting points of the crank arm a first one of the power input components and a second set of mounting points for interfacing with corresponding mounting points of a second one of the power input components, wherein the adapter member is positioned between and interconnects the first and second power input components through the first and second sets of mounting points, wherein the first and second mounting points are at a common radius relative to a center of the sensor ring and wherein the adapter member has a closed body and the first and second sets of mounting points are on the closed body of the adapter member, and wherein the adapter member includes at least one force transmission area defined at least in part by a void area in the sensor ring, wherein the strain sensor is associated with the force transmission area and is adapted to measure strain in the force transmission area resulting from power applied to the crank arm by a cyclist; and
   fasteners for fastening the adapter member to the first and second power input components.

16. The kit of claim 15 further comprising a circuit board for mounting to the bicycle, the circuit board containing circuitry for communicating with the strain sensor.

17. The kit of claim 16 wherein the circuitry is capable of determining the torque placed on the crank set from measurements taken by the strain sensor.

18. The kit of claim 17 wherein the circuitry includes a transmitter for transmitting a value of torque to a processor capable of determining power exerted by a cyclist from the torque value and a value of angular velocity.

19. The kit of claim 15 wherein the adapter member has a generally flat annular body with a number of angularly spaced force transmission areas defined along the body, wherein the void area which at least in part defines each force transmission area comprises a recess in the adapter member adjacent the force transmission area, and wherein each force transmission area has a strain sensor.

20. The kit of claim 15 wherein each force transmission area is defined between a pair of recesses in the sensor ring, wherein a first one of the recesses extends inwardly from an outer edge defined by the sensor ring and a second one of the recesses extends outwardly from an inner edge defined by the sensor ring.

21. The kit of claim 15 wherein the sensor ring includes a plurality of posts extending outwardly from the annular body, and wherein each post defines a force transmission area and a strain sensor is connected to each post.

22. The kit of claim 21 wherein each post defines an inner portion secured to one of the first and second power input components and an outer portion secured to the other of the first and second power input components, and wherein the void area is defined between the inner portion and outer portion of each post.

23. A crank set for a bicycle, comprising:
   a plurality of power input components including a crank arm and one or more chain rings;
   a generally annular and closed body mounted within the power input arrangement, wherein the annular body includes first and second sets of mounting points for interconnecting the annular body between a first one of the power input components and a second one of the power input components, wherein the annular body is positioned between and interconnects the first and second power input components through the first and second sets of mounting points, wherein the first and second mounting points are at a common radius relative to a center of the annular body, and wherein the annular body includes at least one force transmission area defined at least in part by a void area in the annular body; and
   a strain gauge arrangement mounted to the force transmission area and configured to measure strain in the force transmission area resulting from power the torque applied by a cyclist to propel the bicycle.

24. The crank set of claim 23 wherein the generally annular body is mounted between a first and a second chain ring.

25. A method of sensing torque applied by a cyclist to operate a bicycle that includes a plurality of power input components including a crank arm and one or more chain rings, comprising the act of interposing a torque sensing adapter between the a first one of the power input components and a second one of the power input components, wherein the torque sensing adapter has a closed body and includes a first set of mounting points for coupling to the chain ring first power input component and a second set of mounting points for coupling to the second power input component such that the torque sensing adapter is positioned between and interconnects the first and second power input components through the first and second mounting points, wherein the first and second mounting points are at a common radius relative to a center of the torque sensing adapter, wherein the torque sensing adapter includes at least one force transmission area defined at least in part by a void area in the torque sensing adapter, and using at least one strain sensor associated with the force transmission area of the torque sensing adapter to measure strain in the force transmission area resulting from power applied to the crank arm by a cyclist during riding of the bicycle.

* * * * *

UNITED STATES PATENT AND TRADEMARK OFFICE
CERTIFICATE OF CORRECTION

| | |
|---|---|
| PATENT NO. | : 7,975,561 B1 |
| APPLICATION NO. | : 12/396210 |
| DATED | : July 12, 2011 |
| INVENTOR(S) | : Jesse Ambrosina et al. |

Page 1 of 1

It is certified that error appears in the above-identified patent and that said Letters Patent is hereby corrected as shown below:

IN THE CLAIMS

CLAIM 15, column 7, line 53-54, delete "the crank arm";

CLAIM 23, column 8, line 58, delete "the torque";

CLAIM 25, column 8, line 66, delete "the" (1$^{st}$ occurrence).

Signed and Sealed this

Thirteenth Day of September, 2011

David J. Kappos
*Director of the United States Patent and Trademark Office*